United States Patent
Nomura

[11] Patent Number: 5,519,305
[45] Date of Patent: May 21, 1996

[54] CONTROL APPARATUS FOR GENERATOR

[75] Inventor: Yoshiyuki Nomura, Yokohama, Japan

[73] Assignee: Nissan Motor Co., Ltd., Yokohama, Japan

[21] Appl. No.: 160,643

[22] Filed: Dec. 2, 1993

[30] Foreign Application Priority Data

Dec. 7, 1992 [JP] Japan .................. 4-326970

[51] Int. Cl.⁶ ........................................ H02P 9/04
[52] U.S. Cl. ................. 322/14; 322/15; 322/18; 363/123
[58] Field of Search ..................... 322/23, 18, 21, 322/25, 38, 39

[56] References Cited

U.S. PATENT DOCUMENTS

| | | | |
|---|---|---|---|
| 4,481,459 | 11/1984 | Mehl et al. | 322/10 |
| 4,554,501 | 11/1985 | Baker | 322/29 |
| 4,973,896 | 11/1990 | Shiga et al. | 322/28 |
| 5,015,941 | 5/1991 | Dhyanchand | 322/10 |
| 5,237,260 | 8/1993 | Takakado et al. | 322/10 |
| 5,317,498 | 5/1994 | Dhyandchand et al. | 363/43 |
| 5,352,971 | 10/1994 | Nishimura | 322/27 |

FOREIGN PATENT DOCUMENTS 58-131342  8/1983  Japan .
4-38199    2/1992  Japan .

*Primary Examiner*—Steven L. Stephan
*Assistant Examiner*—Nicholas Ponomarenko
*Attorney, Agent, or Firm*—Lowe, Price, LeBlanc & Becker

[57] ABSTRACT

A control apparatus for a generator having an inverter, an engine directly coupled to the generator, and a mode selection switch which manually selects either of a low load mode or a high load mode. In the control apparatus for the generator, when an excessive load is determined to be applied to the inverter during the selection of the low load mode, the inverter is temporarily interrupted so that the engine is accelerated up to a rated revolution speed and, thereafter, the inverter is automatically returned in its operating state.

13 Claims, 7 Drawing Sheets

FIG.5

| LOAD (kW) | 0.00 | 0.06 | 0.12 | 0.18 | ⟶ | 2.28 | 2.34 | 2.40 | 2.46 | 2.52 | 2.58 |
|---|---|---|---|---|---|---|---|---|---|---|---|
| TARGET R.P.M. (×1000rpm) | 80.0 | 80.5 | 81.0 | 81.5 | ⟶ | 97.5 | 98.0 | 98.5 | 99.0 | 99.5 | 100 |

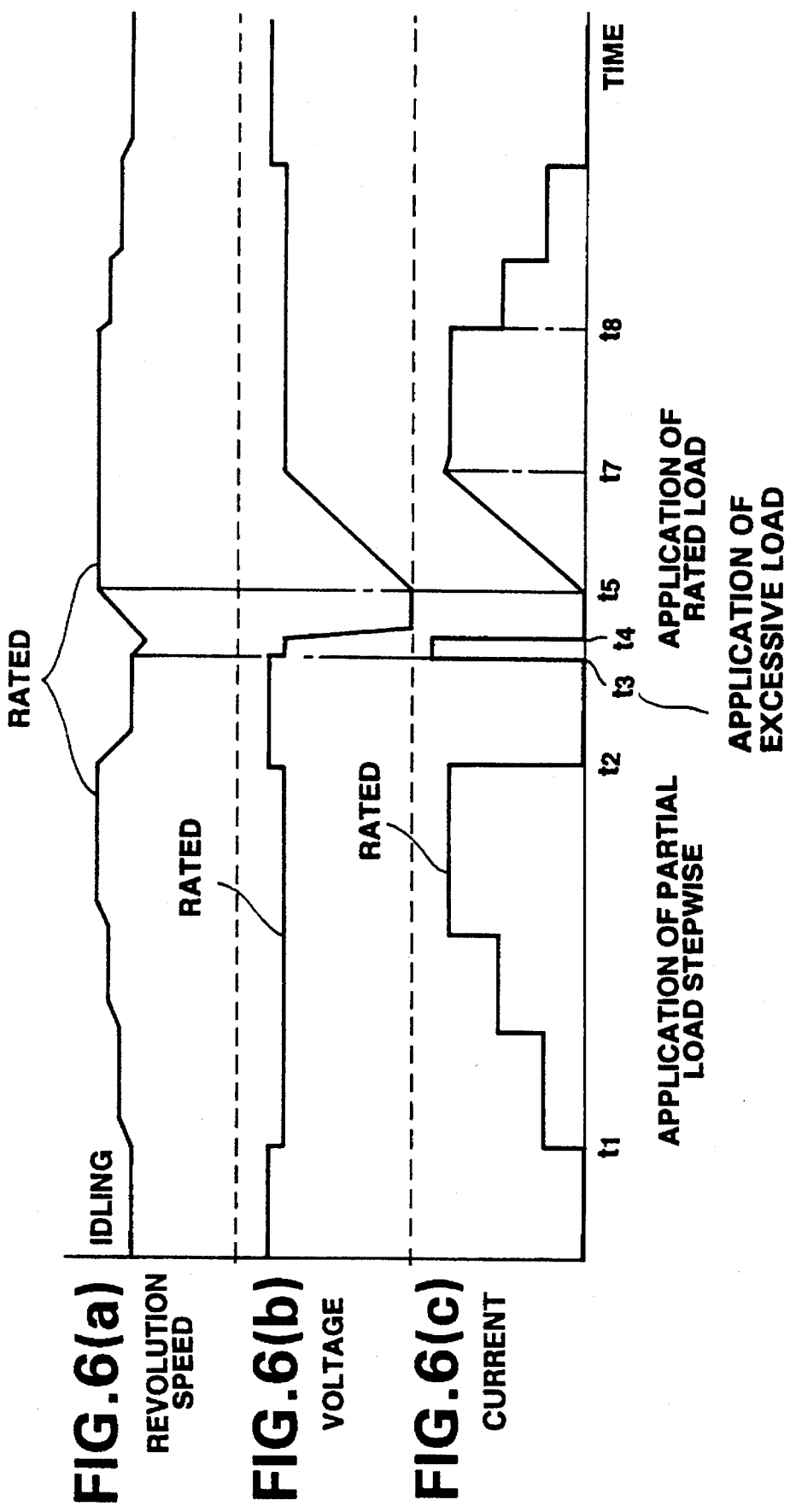

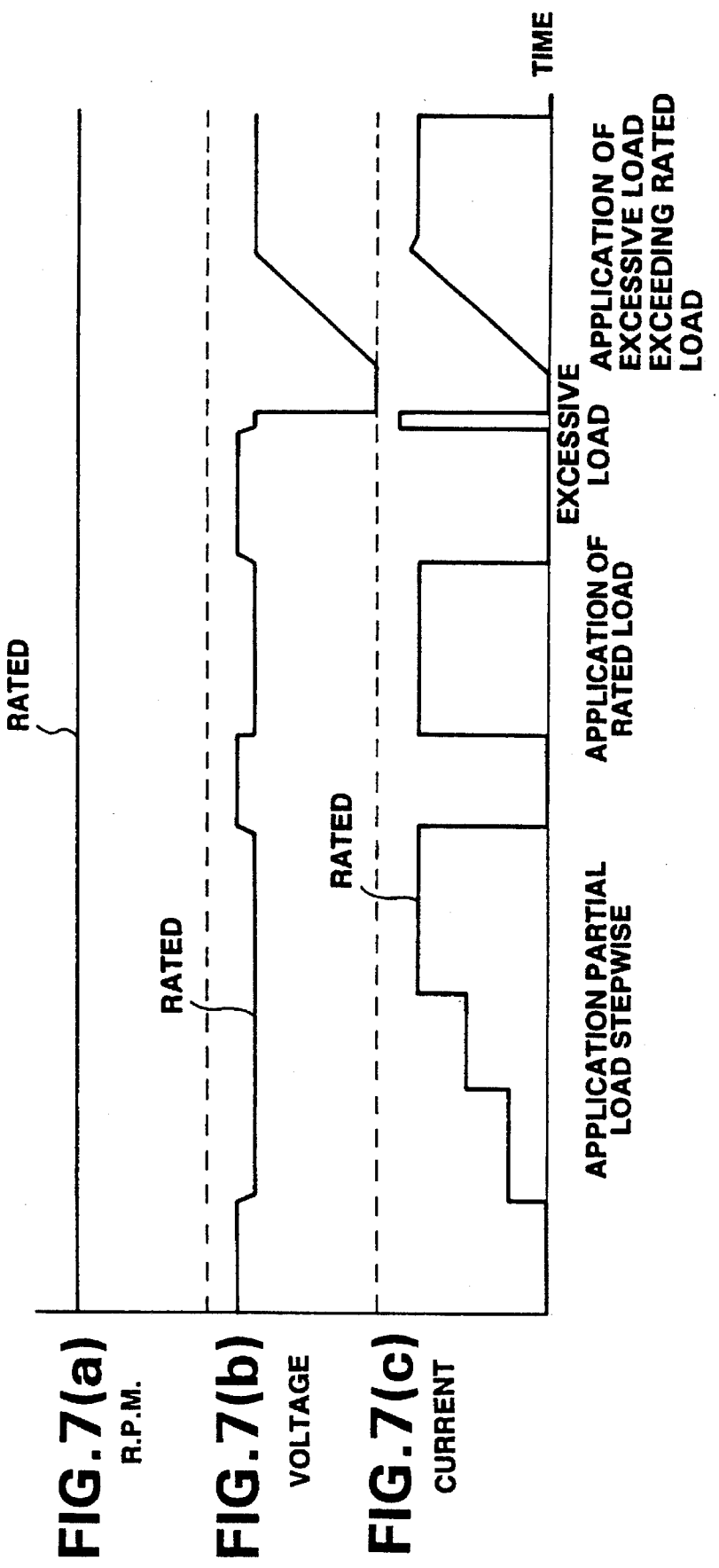

5,519,305

CONTROL APPARATUS FOR GENERATOR

BACKGROUND OF THE INVENTION

1. Field of the Invention

The present invention relates generally to an apparatus for controlling a generator, the generator being directly coupled to, e.g., a gas turbine engine.

2. Description of the Background Art

A previously proposed control apparatus for an AC generator is exemplified by an Operation Manual of Honda EX 300 published by Honda Giken Kogyo, Company Limited in 1991.

In the above-identified Operation Manual, the generator is directly connected to a reciprocating engine, a thyristor-type inverter receiving three-phase voltages generated on respective windings of the generator and inverting them into a single phase rectangular wave AC voltage having a frequency of 50 Hz. An electrical load is connected to an AC receptacle across which the single phase rectangular wave AC voltage appears.

In the above-described configuration, it is not necessary to revolve the reciprocating engine at a rated revolution speed of the generator even when such a low load as only connecting a small electrical load is applied which has a power smaller than a rated power. This is because the continued revolution of the engine at the rated revolution speed means a wasteful consumption of engine fuel.

Therefore, a manual mode switch to select either a high load mode or a low load mode is installed on an external a controller. When the low load mode is selected, a revolution speed control is carried out by the controller according to the electrical load. With no electrical load, the engine is held in a low-speed idling state. The controller controls the revolution speed of the engine so that the revolution speed becomes higher than the idling speed according to-the electrical load only when the electrical load is applied, thereby suppressing the wasteful fuel consumption.

If an excessive current flows in a case of the high load mode in which the engine (internal combustion engine) is always revolved at a rated revolution speed, the inverter is interrupted. If a load current exceeding rated powers flowed (both rated output powers of the engine and inverter), the engine revolution speed would become low and the inverter would possibly burn out due to temperature rises of switching elements (thyristors) with the inverter. To prevent such burn out the components of the inverter and lowered engine revolution speed, an output (current) of the inverter is detected so that when an excessive current above a predetermined value flows, the operation of the inverter is halted.

However, in the case of the low electrical load mode, the engine and inverter can only cope with the electrical load up to about ⅓ a rated load. Therefore, when a load exceeding about ⅓ the rated load (for example, the rated load) is abruptly applied with the engine being idle, the engine becomes under an excessive load state and stalls. To prevent such engine stalling, the mode switch needs to manually be switched to the high load mode. This is because the detection of the excessive current is determined with reference to the same set value of the excessive current as that in the case of the high load mode. Therefore, the inverter would not interrupted in the case of the low load mode.

SUMMARY OF THE INVENTION

It is therefore a principal object of the present invention to overcome the above-described problem of the previously proposed control apparatus for the generator and to provide an improved control apparatus for a generator in which when the excessive load is determined to be applied in the low load mode, with the inverter being temporarily interrupted to enlighten the load, the engine revolution speed is made high and, thereafter, the inverter is returned to its operating state so that when the excessive load is applied in the selection of the low load mode, the engine can cope with the large load without stalling of the engine.

The above-described object can be achieved by providing a control apparatus for a generator, comprising: a) an engine which increases its revolution speed according to an input fuel supply quantity, the generator being directly coupled to the engine; b) an inverter which inverts an output of the generator and outputs the inverted output voltage into an alternating current voltage; c) an electrical load connected to an output end of the inverter; d) a first sensor which detects the electrical load; e) a second sensor which detects a revolution speed of the engine; f) a mode selection switch which operatively switches between a low load mode and a high load mode; g) first means for carrying out a feedback control of the fuel supply quantity so that an engine revolution speed is in accordance with a value of load detection by the first sensor on the basis of load detected value and revolution speed detected value when the low load mode is selected through the mode selection switch; h) second means for determining whether an excessive load is applied to the output of the inverter when the low load mode is selected; and i) third means for temporarily interrupting the inverter so that the engine is accelerated up to a rated revolution speed and, thereafter, returning the inverter when the second means determines that the excessive load is applied thereto during the selection of low load mode.

BRIEF DESCRIPTION OF THE DRAWINGS

FIG. 5 is a map indicating a relationship between a load and a target revolution speed of the gas turbine in the case of the preferred embodiment shown in FIGS. 1 through 4.

FIG. 6 is a waveform chart for explaining an action of the control apparatus in a low load mode.

FIG. 7 is a waveform chart for explaining an action of the control apparatus in a high load mode.

DESCRIPTION OF THE PREFERRED EMBODIMENT

Reference will hereinafter be made to the drawings in order to facilitate a better understanding of the present invention.

Figure 1:
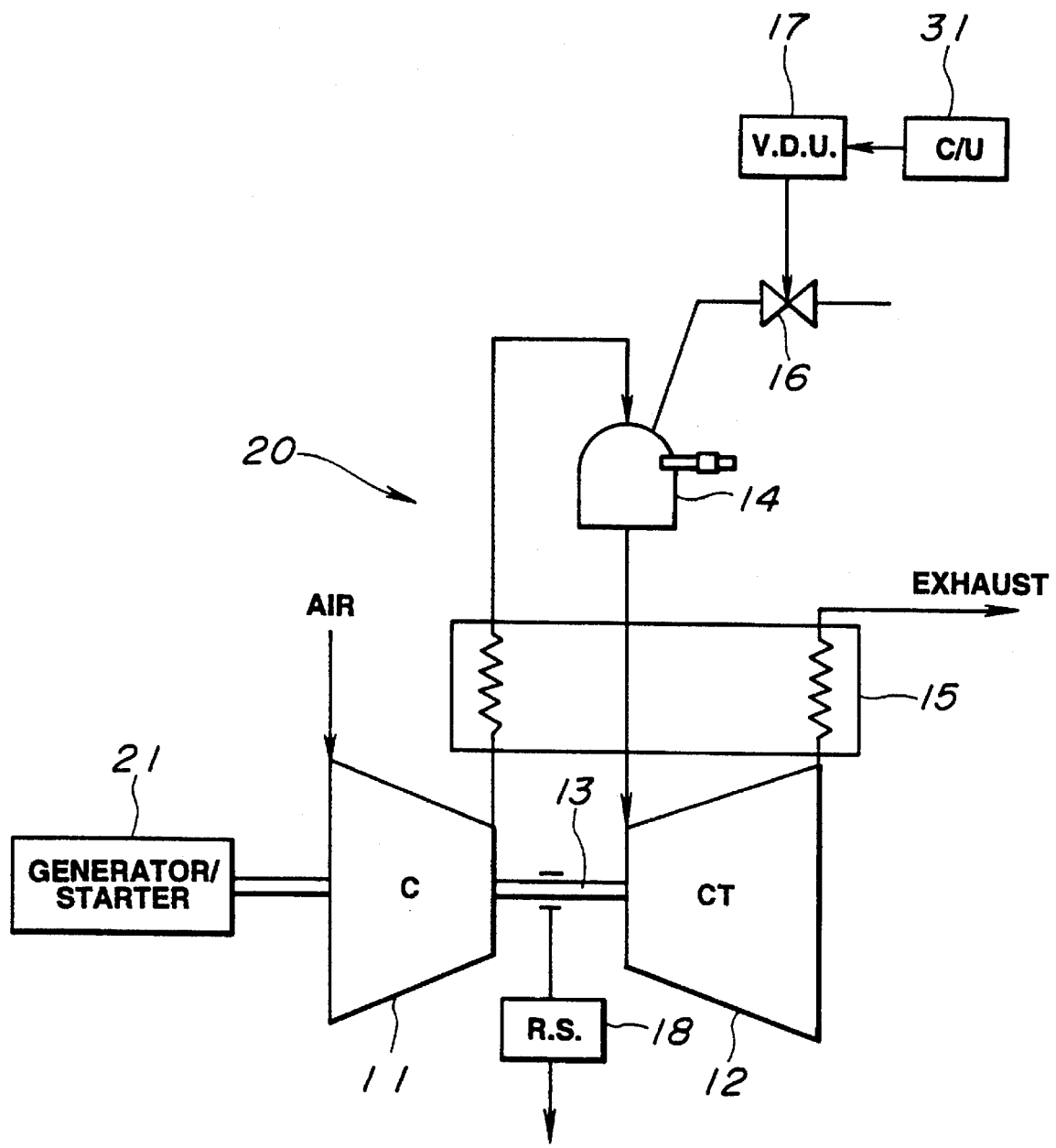
FIG. 1 is a schematic connection diagram of a gas turbine, generator, and a control apparatus to which a preferred embodiment according to the present invention is applicable.

FIG. 1 shows a gas turbine, a generator (alternator functions as a engine starter), a control apparatus in a preferred embodiment, and so forth.

As shown in FIG. 1, a gas turbine 20 includes a compressor 11, a compressor turbine 12 connected to the compressor 11 via a turbine axle 13, combustion vessel 14, and heat exchanger 15. Air is compressed by means of the compressor 11 into the combustion vessel 14 in which a fuel injected through a fuel injection valve is mixed with the compressed air and burned and combusted. An exploded and expanded combusted gas revolves the compressor turbine 12, the revolution force causes the compressor 11 which has the same axle as the turbine 12 to be driven. Heat, which is recirculated from an exhaust gas derived from the compressor turbine 12 by means of the heat exchanger 15 and the exhaust gas, is transmitted to the compressed air in the compressor 11.

A fuel quantity adjusting valve 16 is installed to adjust a flow quantity of fuel and is driven in response to a drive signal from a valve drive actuator 17 (V. D. U.) which receives a command from a control unit 31.

A three-phase AC generator 21 is directly coupled to the compressor 11 of the gas turbine 20.

A reason that the direct coupling of the generator 21 to the compressor 11 is to make a dimension and a weight of the generator compact and light since the generator 21 is of a high revolution type.

Figure 2:
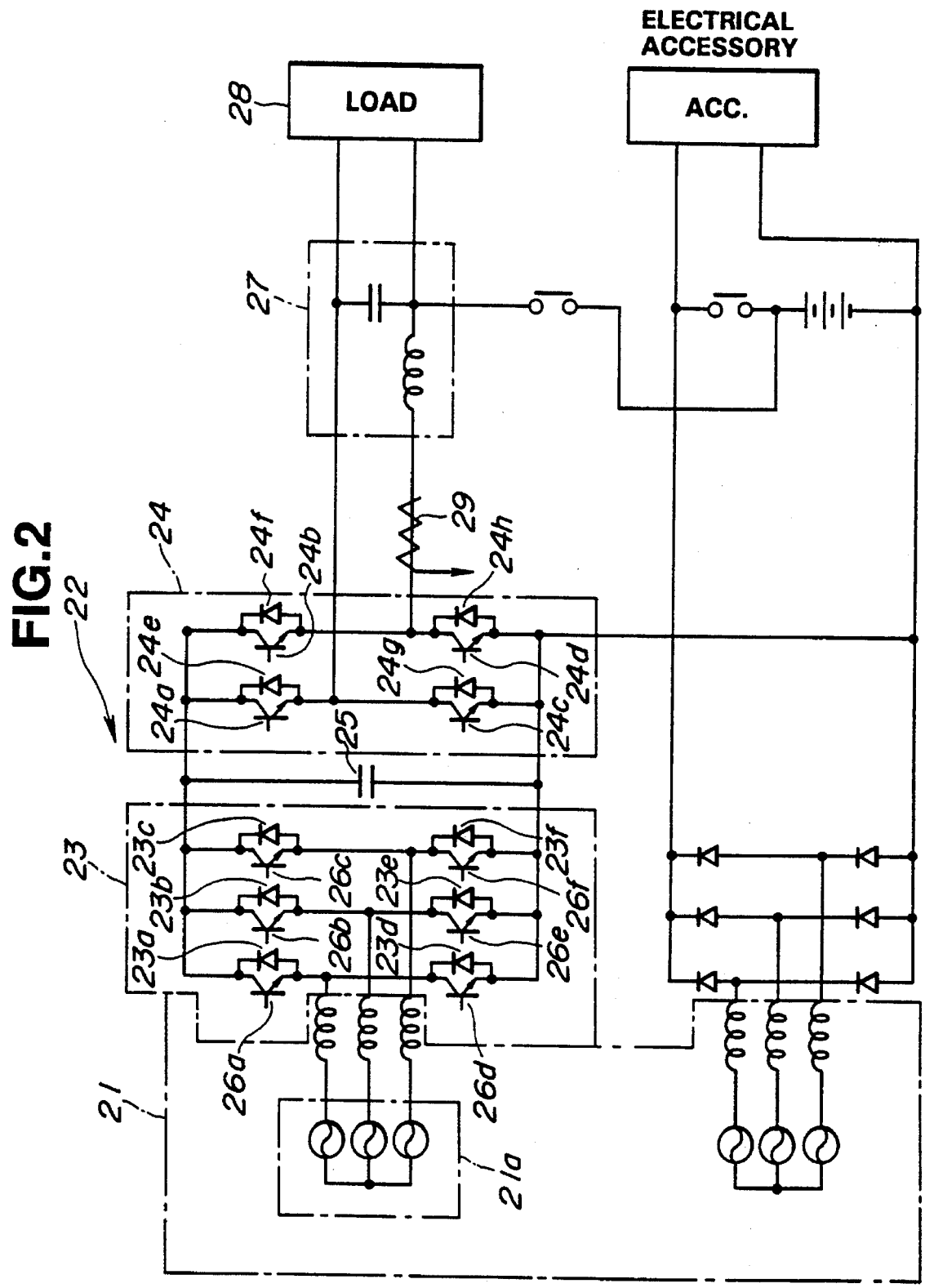
FIG. 2 is an electrical circuit wiring diagram of the control apparatus including an inverter in the preferred embodiment shown in FIG. 1.

FIG. 2 shows an electrical circuit wiring diagram of the generator 21, a transistor inverter 22, and a peripheral circuit in the preferred embodiment of the control apparatus for the generator shown in FIG. 1, including an accessory switchably connected across a battery.

An output of the generator (i.e., a main winding 21a) is inverted into a single phase 100 volts alternating output by means of the transistor type inverter 22. A smoothing circuit 27 is provided via which an electrical load 28 is connected to the inverter 22. The reason of installing the inverter 22 is to retrieve an output of a constant voltage and constant frequency regardless of the revolution speed of the generator 21. An outside dimension with respect to the output is such that when the revolution speed is increased, the outside dimension becomes reduced. For example, as compared with a reciprocating engine having the revolution speed generally of several thousand revolutions per minutes (rpm), the revolution speed is as high as 0.1 million rpm. Therefore, if the same output appears, about ¼ the outside dimension can be saved and about 1/10 weight can be saved.

The transistor type inverter 22 is of a voltage type as shown in FIG. 2. The transistor type inverter 22 includes a half wave rectifying circuit 23, an H type bridge circuit 24, and a large capacity capacitor 25 connected between the half wave rectifying circuit 23 and H type bridge circuit 24.

The half wave rectifying circuit 23 includes six diodes 23a through 23f and the H type bridge circuit 24 includes four transistors 24a through 24d and four diodes 24e through 24h. After converting the three-phase alternating current from the generator 21 into the direct current by means of the rectifying circuit 23, base currents of the four transistors 24a through 24d are used to turn on and turn off the transistors 24a through 24d in a predetermined order so as to obtain a sinusoidal wave output of the single phase 100 volts (generally the same as a commercial power supply).

To operate or interrupt the inverter 22, transistors 26a through 26f are connected in parallel to the respectively corresponding diodes 23a through 23f of the rectifying circuit 23 so that when all of the transistors 26a through 26f are turned off (no base current flows) in response to an instruction from the controller 31, the rectifying circuit 23 functions in a manner known to those skilled in the art.

However, if the base currents flow through the respective transistors 26a through 26f, the diodes 23a through 23f are prevented from functioning in the known manner. Consequently, the inverter 22 is interrupted.

A control unit 31 shown in FIG. 1 is installed to control the operation or interruption of the inverter 22 and to control the revolution speed of the gas turbine. The control unit 31 includes a microcomputer.

Figure 3:
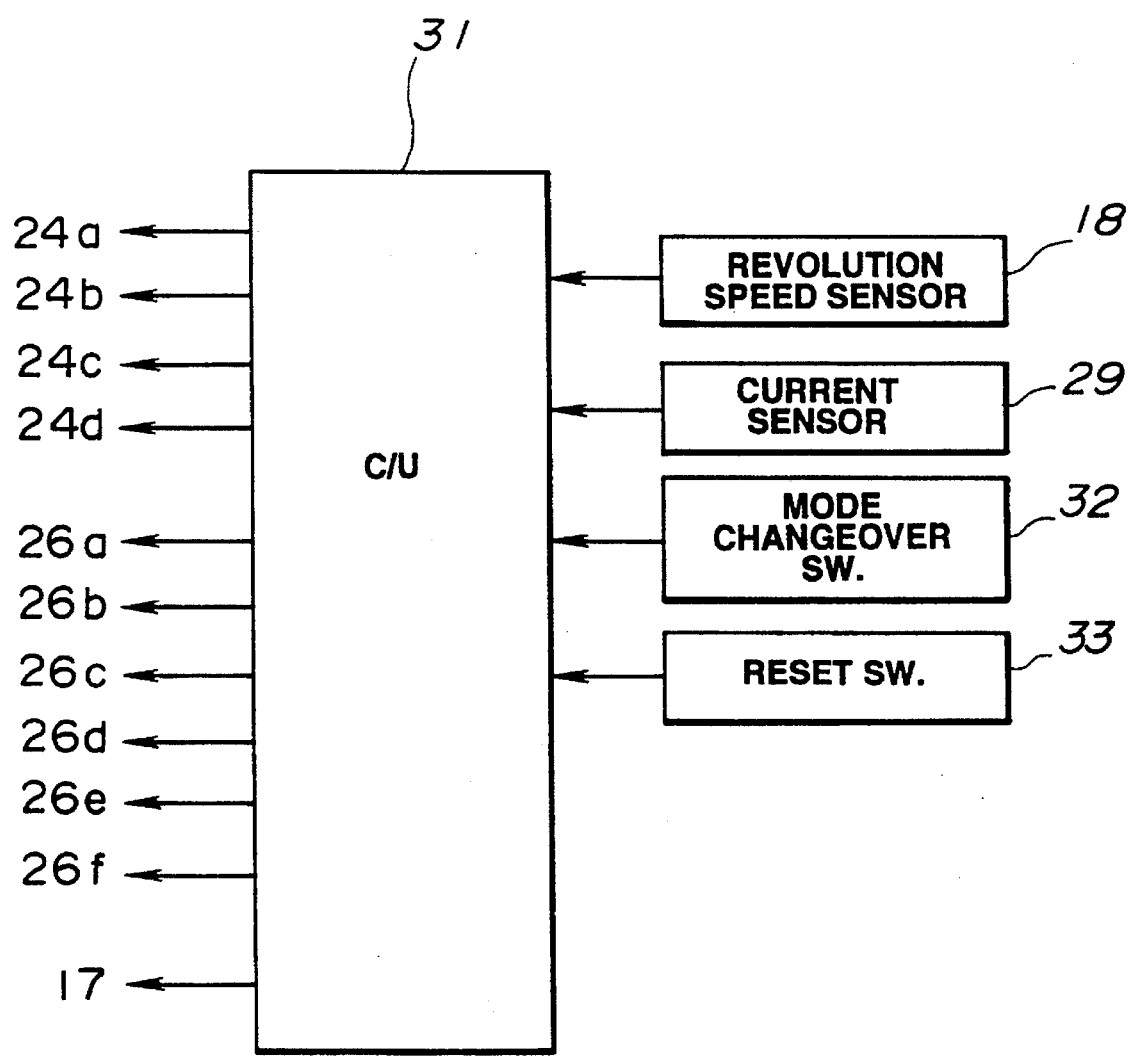
FIG. 3 is a schematic wiring diagram around a control unit of the control apparatus in the preferred embodiment shown in FIGS. 1 and 2.

As shown in FIG. 3, the control unit 31 receives signals from a revolution speed sensor 18 (refer also to FIG. 1) which is so constructed as to produce a signal indicating the gas turbine revolution speed, a load current sensor 29 which is so constructed as to produce a signal indicating a load current, and a manual mode selection switch 32. When a high load mode is selected by means of the mode selection switch 32, upon detecting selection of the high load mode at step S1 of FIG. 4, the gas turbine 20 is driven in step S4 of FIG. 4 at a rated revolution speed (100,000 rpm) (as will be described later).

When a user (customer) determines that the electrical load is not required at a rate running load and switches the mode selection switch 32 to the low load mode, upon detecting the low-load mode at step S1 the revolution of the gas turbine is reduced to the idling condition. When the electrical load is applied across a receptacle, the control unit 31 carries out a feedback control of a fuel quantity so that the gas turbine revolution speed is increased according to a magnitude of the load step S3 of FIG. 4).

For example, a table look-up is carried out from the instantaneous load (accurately, a value in which a load current detected by a current sensor 29 multiplied by an inverter output voltage) to derive a target revolution speed so that a fuel flow quantity is controlled in a PID (Proportional-Integral-Differential) control mode, thereby the actual revolution speed of the turbine coincident with the target revolution speed.

The map of the target revolution speeds is shown in FIG. 5. A shown in FIG. 5, the target revolution speeds (rpm) are allocated in the map for units of 0.06 (Kilowatts). For example, when no load is applied (0.00 KW), the target revolution speed is minimized as 80,000 rpm, when 1.5 KW load is applied, the target RPM is 92,500 rpm, and when 2.6 KW load is applied, the target R.P.M. is 100,000 rpm (rated revolution speed).

On the other hand, if a large load as high as the rated load in the low load mode selected by means of the mode selection switch is abruptly applied with the gas turbine frequency being in the idling revolution speed, the gas turbine (engine) becomes overload condition and the revolutions would stall. To prevent such engine stalling or gas turbine stalling, it is troublesome to manually switch the mode selection switch 32 to the high load mode.

To cope with such trouble as described above, the control unit 31 determines whether the gas turbine becomes overload condition and temporarily halts the inverter 22 (the gas turbine is forcefully turned into the no load state) so that the gas turbine is increased to the rated revolution speed (100,000 rpm). Thereafter, the inverter 22 is returned to be operated (steps S4 through S8 of FIG. 4). Consequently, avoiding the revolution stop, the rated revolution speed is used to cope with such a sudden increase of the load as described above.

Figure 4:
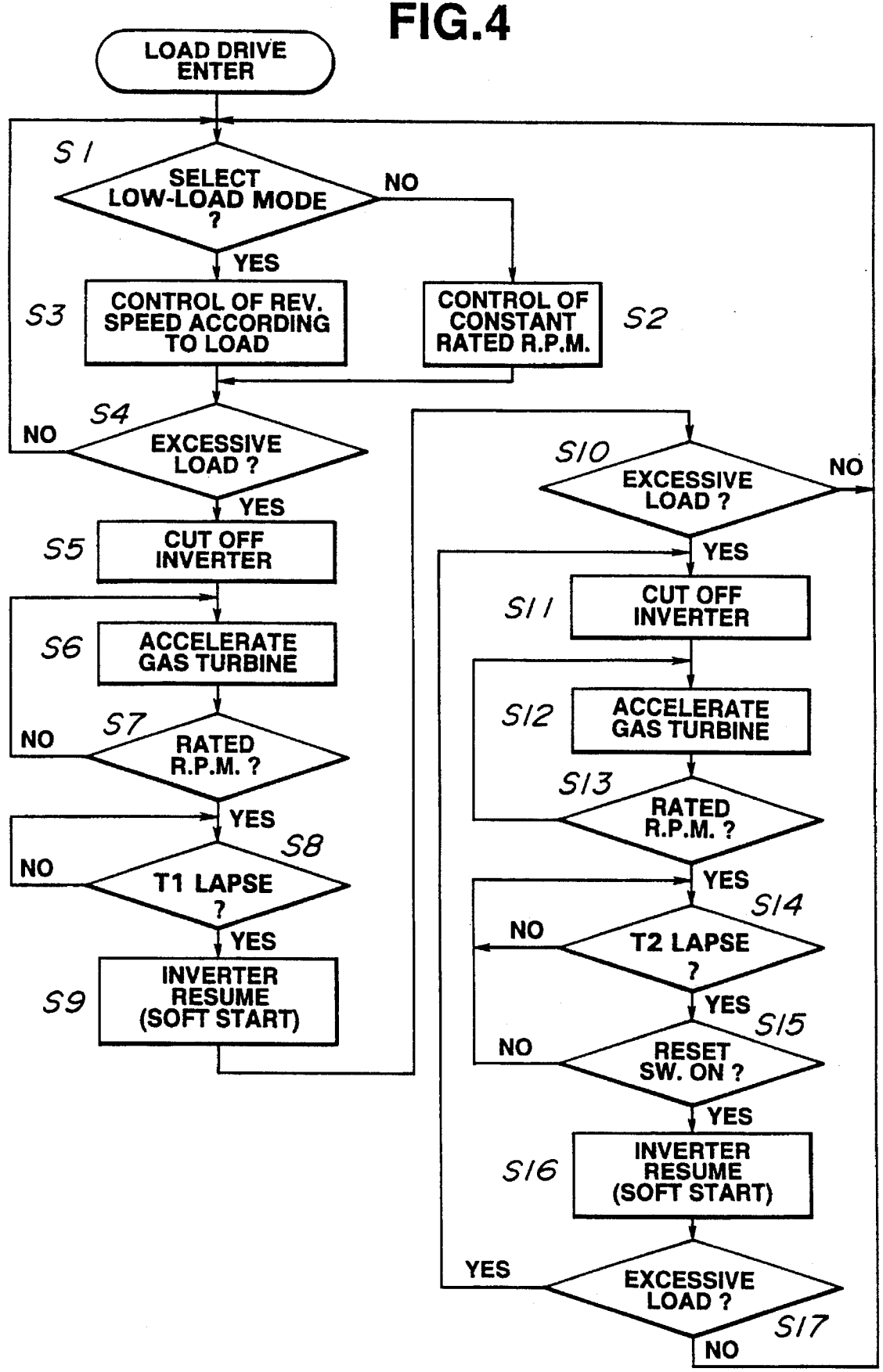
FIG. 4 is an operational flowchart of the control unit for explaining a load operation control of the control unit in the preferred embodiment shown in FIGS. 1 through 3.

FIG. 4 shows the operational flowchart of the control unit 31.

The explanations of FIG. 4 are divided into three parts <1> those for a processing against the excessive load application, <2> a manual resetting, and <3> the high mode selection.

It is noted that the inverter 22 is turned on when the idling condition or rated load driving is entered after the start of the turbine.

<1> Processing against the excessive load:

When either of the following conditions is satisfied, the control unit 31 determines that the excessive load is applied (refer to the step S4 of FIG. 4).

① When the load current exceeding a predetermined load current value flows for a time period exceeding a predetermined time period. For example, when the load current of 40 A detected by the load current sensor 29 is over 0.3 seconds at the revolution speed of 80,000 rpm and over 0.3 seconds at the revolution speed of 90,000 rpm. In addition, the excessive load is determined to be applied when the instantaneous load current is 60 A, for example, ② When the gas turbine revolution speed is lowered. For example, the gas turbine revolution speed is reduced up to a revolution speed slightly higher than a lowest limit revolution speed by which the gas turbine cannot maintain its idling speed.

On the other hand, when the inverter 22 is returned to the normal operation, the output voltage of the inverter 22 is not abruptly increased but is gradually increased (so-called soft start). That is to say, characteristics of the used inverter 22 that the frequency and voltage are freely varied are exhibited so that the output voltage of the inverter 22 is gradually increased so as to reduce a rush-in current such as a motor load.

In addition, it is noted that the return of the inverter 22 is delayed by a constant period of time (TI) from a time at which the gas turbine reaches the rated revolution speed (refer to a step S8 of FIG. 4). This is because it needs time to stabilize the gas turbine revolution speed.

<2> Manual reset:

As described in <1>, the automatic return of the inverter 22 is carried out so that the gas turbine is revolved at the rated revolution speed to cope with the abrupt application of the large load. However, such a situation where a load exceeding the rated load may be applied. To cope with such an excessive load application, when the excessive load is again determined after the automatic return of the inverter 22, the inverter 22 is interrupted and thereafter a reset switch 33 (refer to FIG. 3) is manually turned on to return the inverter 22 again (steps S10 through 17 of FIG. 4), the reset switch 33 being installed on an external part of the control unit 31.

However, the conditions to determine that the excessive load is applied (steps S10 and S17 of FIG. 4), the fact that the gas turbine is accelerated up to the rated revolution speed (steps S12 and S13 of FIG. 4), how to automatically return the inverter 22 (step S16 of FIG. 4) are the same as those in the case of <1>. That is to say, with the gas turbine revolved at the rated revolution speed (100,000 rpm), the inverter 22 is returned when the reset switch 33 is turned on and the inverter 22 is again interrupted if the higher load is determined to be applied (steps S15, S16, S17, and S11 of FIG. 4). That is to say, the inverter 22 is not returned until the user reduces the load and manually turns on the reset switch 33.

It is noted that a wait time T2 (constant value) from a time at which the gas turbine has revolved at the rated revolution speed is different from that in the case of <1> (step S14 of FIG. 4).

<3> When the high load mode is selected:

When the excessive load is determined to be applied in the high load mode, as is different from a case described in the BACKGROUND OF THE INVENTION, the inverter 22 is automatically returned in the same way as <1> after the inverter is interrupted and the case of <2> is adopted (steps S1, S2, S4, S9, S10 through S17 of FIG. 4).

An action of the preferred embodiment described above will be explained with reference to FIG. 6.

When the low load mode is selected, the gas turbine is revolved at the low-speed idling speed unless no load is applied so as to save the fuel consumption.

For example, when the electrical load is stepwise increased from a time point of $t_1$ before which the gas turbine is in the idling state in FIG. 6, the turbine revolution speed is stepwise increased up to the rated revolution speed according to the increase in the electrical load. In the low load selection mode, the fuel consumption is suppressed since the revolution speed is dropped to a lower revolution speed than the rated revolution speed when the load is minor or no load is applied.

On the other hand, if such a large load as about high as the vicinity to the rated load is abruptly applied at a time point of $t_3$ at which the gas turbine speed is returned to the idling speed, a current exceeding a set maximum current during the idling flows.

In this case, the control unit 31 determines that the excessive load is applied at a time point of $t_4$ at which the predetermined period of time has passed and the inverter 22 is interrupted (current value indicates 0). The interruption of the inverter 22 causes the gas turbine to be under no load and thereafter the gas turbine to be accelerated. The inverter 22 is again returned at a time point of $t_5$ at which the gas turbine speed reaches the rated revolution speed (100,000 rpm).

When the excessive load is determined to be applied in the low load selection mode, the inverter 22 is temporarily halted and the gas turbine is accelerated up to the rated revolution speed and, thereafter, the inverter 22 is returned. Therefore, when the load in the vicinity to the rated load is abruptly applied with the gas turbine in the idling state, the gas turbine revolution speed can be used up to the rated load even without manual selection of the mode switch to the high load mode and without stop of the gas turbine.

It is noted that if the load is thereafter reduced with the gas turbine revolved at the rated revolution speed, the revolution speed control according to the load is carried out at a time point of $t_8$ at which the load is reduced.

When the output voltage of the inverter 22 is gradually increased with the inverter 22 returned at time points from $t_5$ through $t_7$, the rush-in current due to the motor load application can be reduced. The rush-in current appears as a large current (theoretically infinite) flows into a coil or capacitor of the motor when the motor power switch is turned on. Especially, the value of the current is large until the motor revolves up to a relatively high speed the rush-in current in the case of the motor appears from a time at which the motor switch is turned on to a time of several ten milliseconds.

Furthermore, in a case where, after the inverter 22 is automatically returned, the electrical load exceeding the rated load is continued to be applied, the control unit 31 determines again that the excessive load is applied, the gas turbine speed is maintained at the rated revolution speed without return of the inverter 22. At this time, if the reset switch 33 is manually turned on with the user's decision with the load reduced, the inverter 22 is returned. In the case where the load exceeding the rated load is still continued to be applied even after the inverter 22 is automatically returned, temperatures of the switching elements of the inverter 22 are increased if the operation of the inverter 22 is continued. However, at the time when the second determination of the excessive load application, the user owns his responsibility to the return of the inverter so that the temperature rises in the switching elements can be avoided.

As shown in FIG. 7 in which the excessive load (load exceeding the rated load) is applied in the high load mode, the inverter 22 is once interrupted and, thereafter, is automatically returned. When the excessive load is determined to be applied in the high load mode, it is more convenient for the user to use the control apparatus in the embodiment than the previously proposed control apparatus in which the inverter is only interrupted.

It is noted that although, in the preferred embodiment, the gas turbine is used for the generator, the reciprocating engine (gasoline engine or Diesel engine) may alternatively be used.

As described hereinabove, since, in the control apparatus for the generator according to the present invention, the inverter is returned after the engine (gas turbine) is accelerated up to the rated revolution speed with the inverter temporarily interrupted when the excessive load is applied in the low load mode, the gas turbine and control apparatus can be used up to the rated load without manual switching of the mode selection switch to the high load mode and without stop of the engine (gas turbine).

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A control apparatus for a generator driving an electrical load, comprising:
   a) an engine which increases its revolution speed according to an input fuel supply quantity, the generator being directly coupled to the engine;
   b) an inverter which is so constructed and arranged as to convert AC output from said generator into a DC input and to convert the DC input into an AC voltage as an output thereof;
   c) wherein an output end of the inverter is connected to the electrical load;
   d) a first sensor which detects the electrical load;
   e) a second sensor which detects a revolution speed of the engine;
   f) a mode selection switch which operatively switches between a relatively low load mode and a relatively high load mode;
   g) first means for carrying out a feedback control of the fuel supply quantity so that the engine revolution speed is in accordance with a value of load detected by the first sensor on the basis of a load detected value and a revolution speed detected value when the low load mode is selected through said mode selection switch;
   h) second means for determining whether an excessive load is applied to the output end of said inverter when the low load mode is selected; and
   i) third means for temporarily interrupting the inverter so that the engine is in an unloaded condition and accelerated up to a rated revolution speed and, thereafter, resuming the inverter when the second means determines that the excessive load is applied thereto during the selection of low load mode.

2. A control apparatus for a generator as set forth in claim 1, wherein the excessive load determined by the second means is a load exceeding a rated load such that a load current detected by the first sensor flows which exceeds a predetermined load current value for a period of time exceeding a predetermined period of time, a load current detected by the first sensor exceeding 60 flows instantaneously, or when the engine revolution speed is reduced below a predetermined revolution speed which is slightly higher than a lowest speed at which the engine cannot maintain its idling speed any more.

3. A control apparatus for a generator as set forth in claim 2, which further includes a reset switch which is manually turned on to return the interrupted inverter to its operating state, said reset switch being turned on when said second means determines again that the excessive load is still applied in the low load mode after the automatic return of the inverter is carried out by means of the third means.

4. A control apparatus for a generator as set forth in claim 3, said third means again interrupts the inverter even after the manual return of the inverter through the reset switch if the second means again determines that the excessive load is still continued to be applied in the low load selection mode.

5. A control apparatus for a generator as set forth in claim 4, wherein the return of the inverter is carried out gradually so that the output voltage of the inverter is gradually increased to a rated voltage.

6. A control apparatus for a generator as set forth in claim 5, when said second means determines that the excessive load in the case of the high load selection mode is applied during the high load mode selection, the third means temporarily interrupts the inverter and thereafter the inverter is automatically returned.

7. A control apparatus for a generator as set forth in claim 6, wherein the automatic return of the inverter is delayed by a first constant period of time (TONIN#) upon the reach of the engine revolution speed to the rated revolution speed in the case of the low load mode selection.

8. A control apparatus for a generator as set forth in claim 7, wherein the manual return of the inverter by means of the reset switch is delayed by a second constant period of time (TONIN2#) upon reach of the engine revolution speed to the rated revolution speed.

9. A control apparatus for a generator as set forth in claim 8, wherein the inverter is of a transistor type in which a plurality of transistors are connected in parallel to a plurality of diodes and the interruption of the inverter is carried out by flowing base currents of the transistors and the operation of the inverter is carried out by interrupting the base currents.

10. A control apparatus for a generator as set forth in claim 9, wherein said first means revolves the engine at the rated revolution speed when the selection mode switch is placed in the high load mode.

11. A control apparatus for a generator as set forth in claim 10, wherein said engine comprises a gas turbine and wherein the rated revolution speed of the gas turbine is about 100,000 rpm and the idling speed of the gas turbine is about 80,000 rpm with no load.

12. A control apparatus for a generator as set forth in claim 11, wherein said first means derives a target revolution speed according to the value of the electrical load detected by the first sensor and the value of the output voltage of the inverter and controls the fuel supply quantity so that the actual engine revolution speed is coincident with the target engine revolution speed in the low load selection mode.

13. A control method for a generator directly coupled to an engine without stalling the engine, comprising the steps of:

a) monitoring a load current passing through an electrical load and determining whether the monitored load current satisfies an excessive load occurrence condition;

b) determining whether a mode selection switch is placed in either a relatively low load mode or relatively high load mode;

c) monitoring a revolution speed of the engine and determining whether the monitored revolution speed of the engine satisfies a rate revolution speed limit value;

d) when the low load mode is selected, carrying out a feedback control of a fuel supply quantity to the engine to vary the engine revolution speed in accordance with variation of the load current flowing through the electrical load on the basis of the monitored valued of the load current and of the revolution speed;

e) when the low mode is selected, determining whether an excessive load current, which satisfies the excessive load occurrence condition, flows through the electrical load; and f) upon determining that the excessive load current flows, temporarily stopping the operation of an inverter for a predetermined time period so that the engine becomes and is accelerated up to a rated revolution speed and, thereafter, resuming operation of the inverter.

* * * * *